United States Patent [19]
Saito et al.

[11] Patent Number: 5,958,612
[45] Date of Patent: Sep. 28, 1999

[54] MAGNETORESISTIVE READ TRANSDUCER

[75] Inventors: Mikiko Saito; Hiroyuki Sato, both of Tokyo, Japan

[73] Assignee: NEC Corporation, Tokyo, Japan

[21] Appl. No.: 08/972,924

[22] Filed: Nov. 18, 1997

[30] Foreign Application Priority Data

Nov. 28, 1996 [JP] Japan .................................... 8-317925

[51] Int. Cl.$^6$ ...................................................... G11B 5/66
[52] U.S. Cl. ............. 428/692; 428/684 R; 428/694 TR; 428/694 T; 428/694 TS; 428/694 TM; 428/900; 428/336; 360/113; 324/252
[58] Field of Search .......................... 428/694 R, 694 TR, 428/694 T, 694 TS, 694 TM, 692, 900, 336; 360/113; 324/252

[56] References Cited

U.S. PATENT DOCUMENTS 5,549,978  8/1996  Iwasaki .................................... 428/692

FOREIGN PATENT DOCUMENTS

| | | | |
|---|---|---|---|
| 4271001 | 9/1992 | Japan . | |
| 5205224 | 8/1993 | Japan | G11B 5/39 |
| 6195647 | 7/1994 | Japan | G11B 5/39 |
| 7114717 | 5/1995 | Japan | G11B 5/39 |
| 7210829 | 8/1995 | Japan | G11B 5/39 |
| 773418 | 9/1995 | Japan | G11B 5/39 |
| 7307010 | 11/1995 | Japan | G11B 5/39 |
| 7320236 | 12/1995 | Japan . | |

*Primary Examiner*—Leszek Kiliman
*Attorney, Agent, or Firm*—Hayes, Soloway, Hennessey, Grossman & Hage, PC

[57] ABSTRACT

For providing a magnetoresistive read transducer capable of increasing the output by the increase of current, reduced with noises and having a durability, a magnetoresistive read transducer comprising a substrate and laminated thereon, a lower shield, a first gap layer, a thin film magnetoresistive element portion, a longitudinal bias layer, an electrode portion and an upper shield, each in a predetermined pattern successively, in which the entire resistance value of the electric conduction including the contact resistance of the electrode portion 7 is set within 1.2 times of a theoretical resistance value calculated based on the specific resistivity of the layer, in which a polysilicon layer is laminated between the magneto resistive film and the longitudinal bias layer.

17 Claims, 4 Drawing Sheets

MAGNETORESISTIVE READ TRANSDUCER

BACKGROUND OF THE INVENTION

1. Field of the Invention

The present invention concerns a thin film read transducer utilizing the magnet resistance (MR effect) and, more in particular, it relates to a magnetoresistive read transducer suitable to recording/reproduction of information signals in a magnetic recording device.

2. Related Art Statement

Along with the improvement of recording density, it has become necessary to increase the density of a sense current in a magnetoresistive read transducer (hereinafter referred to simply as "MR effect type head") in order to ensure a high head output.

It has been known that remarkable burning out or migration degradation is caused by temperature rise in a magnetoresistive element as the current density increases to more than $2 \times 10^7$ (A/cm$^2$) or $3 \times 10^7$ A/cm$^2$) compared with a current density of about $1 \times 10^7$ (A/cm$^2$).

As shown in FIG. 5, a MR effect type head 51 comprises a central active region for sensing a magnetic field of a medium (also referred to as a magnetoresistive sensing element portion), and tail regions 51B, 51C (also referred to as a longitudinal bias layer) for supplying a longitudinal bias or a sense current to the central active region 51A, in which contact resistance is inevitably caused upon electric connection of them with each other.

Since the density of the sense current is relatively small, control for the contact resistance has not been sufficient. On the other hand, when a conduction test has been actually conducted in the MR effect type head 51 with an increased density of the sense current, it has been confirmed that the resistance of the head increases with lapse of time and an increasing phenomenon of a failed head (change of resistance value by 10% from an initial value before conduction test) has been observed.

For the temperature rise in the head portion of MR effect type heads has been pointed out, although not disclosing the resistance value, in Japanese Patent Laid-Open Hei 7-320236 and Hei 4-271001.

Further, when an accelerated conduction test has been conducted actually, it has been confirmed that abnormality occurs not only in the element portion of the MR effect type head 51 but also in the shielding portion, for example, as elimination or depletion of the layer.

Namely, in the existent MR effect type head 51 described above, temperature rise in the MR element portion results in temperature rise in the shielding portion at the periphery thereof, which is considered to cause the abnormal operation. However, no particular consideration has been taken for the countermeasure (efficient heat dissipation or the like).

Generally, as the density of the magnetic recording increases, the recording wavelength and the width of recording tracks are decreased and the reproducing output of a magnetic head tends to be lowered correspondingly. Various methods may be considered for increasing the reproducing output of the MR effect type head. For instance, a most reliable method is to increase the value of the sense current supplied to the MR element portion. If the sense current increases, the output of the MR effect type head increases substantially in proportion therewith.

On the contrary, since Joule's heat formed in the MR element portion is also increased, the temperature in the MR element portion also rises remarkably. It has generally been known that if the temperature of the MR element portion is excessively high, the output is rather lowered even when the value of the sense current increased exceeding a certain level. In view of the above, it is important to suppress the temperature rise as low as possible even if the value of the sense current is increased.

At the same time, the electric conduction life of the MR effect type head has to be taken into a consideration as a problem with regard to the temperature rise. The electric conduction life of the MR effect type head is determined mainly by the density of the sense current and the element temperature, which is highly sensitive to the temperature and changed exponentially, and lowered greatly by the temperature rise.

SUMMARY OF THE INVENTION

An object of the present invention is to improve such disadvantages in the prior art and provide a durable magnetoresistive read transducer, particularly, capable of increasing the output due to the increase of current and with reduced noises.

The foregoing subject can be solved by efficiently dissipating Joule's heat generated by a sense current of a magnetoresistive read transducer and a current of writing coils combined with the head, thereby sufficiently suppressing the temperature rise of the entire head or temperature rise of the element portion.

Further, as a result of a study on the factor of the temperature rise, it can be confirmed that setting of the resistance for the MR element portion within a predetermined value is effective as shown below. Means adopted for this end will be set forth below.

A magnetoresistive read transducer comprises;

a substrate, an insulating layer formed on the substrate, a lower shield formed on the insulating layer, a first gap layer formed on the lower shield, a thin film magnetoresistive element formed in a predetermined pattern on an end part of the first gap layer, a longitudinal bias layer formed on portions of the magnetoresistive effect element other than a central active portion and on the first gap layer, first and second electrodes formed on the longitudinal bias layer for applying a conduction current from the outside, a second gap layer formed the electrodes and magnetoresistive effect element portion and an upper shield formed above the second gap layer, in which the total resistance value upon electric conduction including the contact resistance between each of the layers is within 1.2 times of a theoretical value calculated based on the shape of the magnetoresistive element portion and the specific resistivity of material.

Further, a polysilicon layer is laminated between the longitudinal bias layer and the electrode, and the magnetoresistive effect element portion are made eutectic near a junction portion with the polysilicon layer.

The polysilicon layer has a layer thickness of not less than 1 nm and not more than 10 nm.

Further, a layer having good heat conductivity may be disposed on the layer of the lower shield. The layer having good heat conductivity is formed of a sputtered NiFe layer, a sputtered Cu layer or a polysilicon layer.

In the magnetoresistive read transducers of the prior art, when read transducers that often cause troubles are analyzed, it has been observed that failures are often found in specimens of magnetoresistive read transducers having large conduction resistance. Then, life time measurement has been conducted to the deviation rate of the resistance value of actual heads relative to a designed resistance value, based on a current conduction test for individual elements as shown in FIGS. 2A, 2B. The resistance deviation rate is defined as a value obtained by dividing the resistance value of an actual head with a designed resistance value. As a result, it has been confirmed that the resistance deviation rate for satisfying the device guarantee (for five years) is within +120% relative to the designed resistance value.

In order to lower the contact resistance, a polysilicon layer of a high surface energy (good wettability) is formed on the junction portion.

Further, from the result of the analysis for failed heads, it has been found that the shield portion not undergoing current supply is eliminated or depleted and it can be confirmed that this is the abnormality in the shield portion caused by the temperature rise.

Since the shielding portion is constituted with a electro plated NiFe layer having many crystal defects, it is poor in the heat conductivity and leads to the temperature rise in the MR element and, further, leads to elimination or depletion of each layer. Accordingly, it is possible to suppress the rise of the element temperature and, further, suppress the elimination or depletion of the layer by forming the region of the shielding portion near the MR element with a highly crystalline sputtered layer or a layer having preferred heat conductivity.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENTS

Preferred embodiments of the present invention are explained with reference to the drawings.

Figure 1:
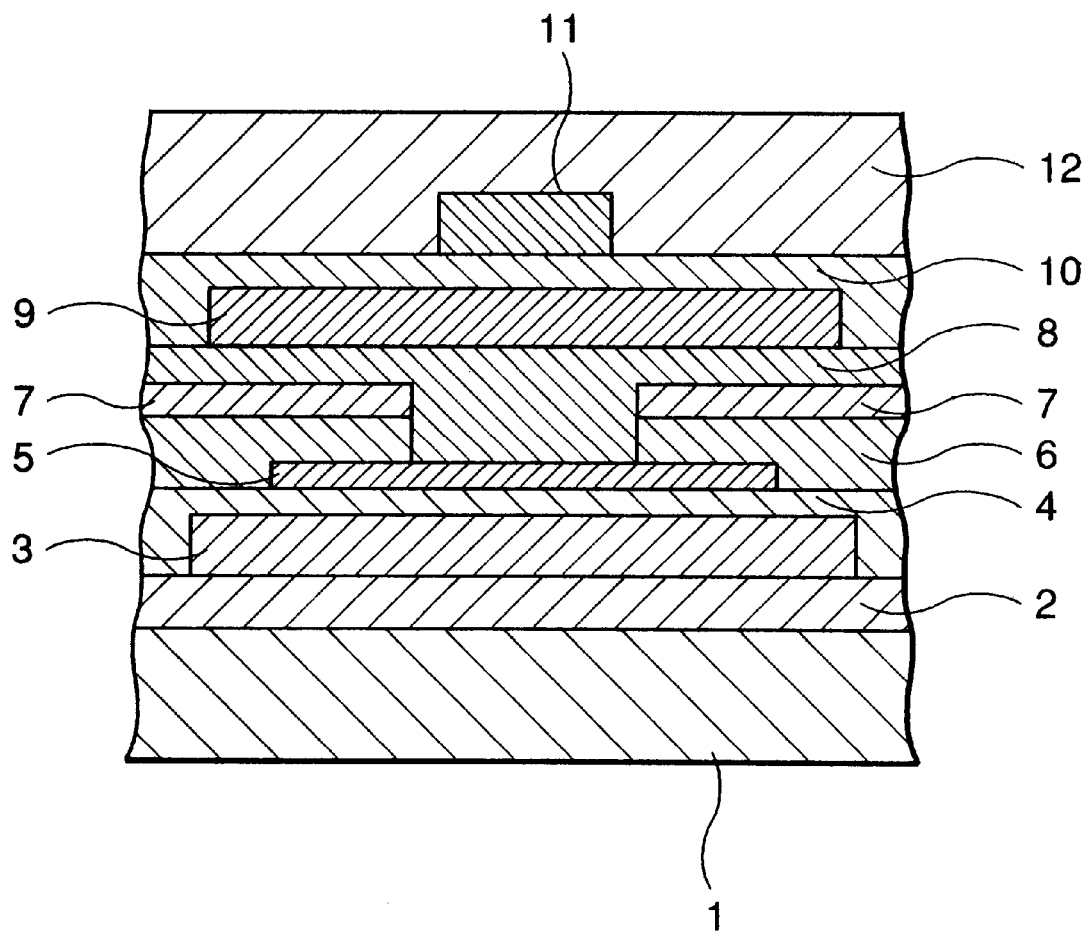
FIG. 1 is a cross sectional view showing a constitution of a first embodiment according to the present invention.

FIG. 1 shows a first embodiment of the present invention.

For a magnetoresistive read transducer shown in FIG. 1, an insulating layer 2 is constituted by depositing alumina or the like by a sputtering method on a substrate 1 comprised of ceramics such as $Al_2O_3$ and TiC. Then, a shield layer (lower shield) 3 comprised of a electro plated NiFe layer is laminated and a first gap layer 4 comprised of an alumina layer is laminated further thereover to form an insulating layer.

Then, a magnetoresistive element portion (MR element portion) 5 comprising a magnetoresistive layer comprised of NiFe, a soft bias layer comprised of CoZeMo or the like for applying a bias magnetic field to the magnetoresistive effective layer and an intermediate layer comprised of Ta or the like is formed and then fabricated into a predetermined shape.

Further, in a magnetoresistive head, it has been known for the problem of noise caused usually by displacement or elimination of domain walls (bulk hauzen noise).

Accordingly, means for suppressing the problem is adopted also in this embodiment. That is, a longitudinal bias layer 6 is formed on a portion of the MR element portion 5 excepting for a track portion, for example, by a lift off method. An electrode layer 7 is also formed for supplying a sense current to the magnetoresistive layer of the MR element portion 5.

The electrode layer 7 is formed, for example, of AU, and a second gap layer 8 formed of an alumina layer is further laminated as an insulating layer.

Finally, an upper shield 9 that functions as a common pole comprised of a electro plated NiFe layer is laminated, and a write magnetic pole 11 comprised of NiFe and a protective layer 12 are successively laminated by way of third gap layer 10 comprised, for example, of alumina and then they are fabricated into a predetermined shape thereby to obtain a magnetoresistive read transducer.

Figure 2:
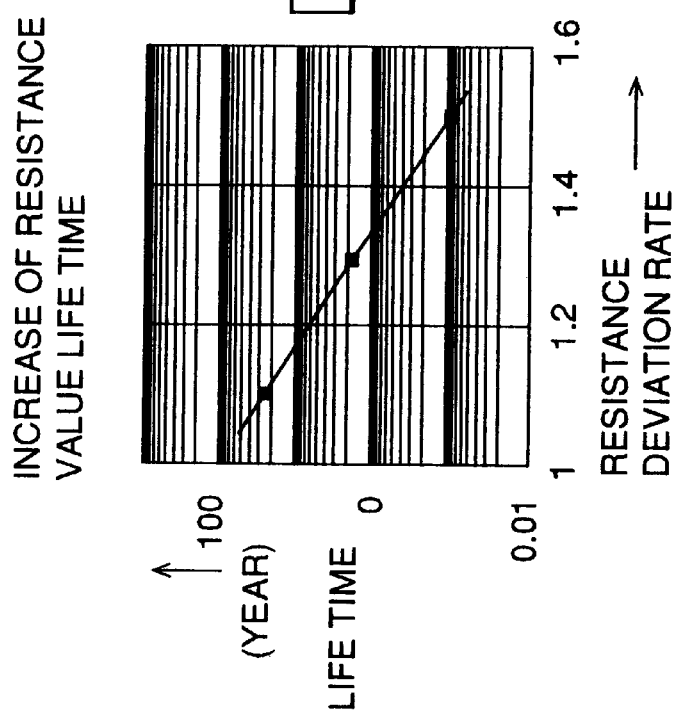
FIG. 2A is a graph illustrating a relation between the increase of a resistance value and a working life time of magnetoresistive read transducers of the first embodiment disclosed in FIG. 1.
FIG. 2B is a table when three points are sampled from FIG. 2A and arranged.

For investigating the durability of the magnetoresistive read transducer as a read head, the life time of individual elements was measured by an electric conduction test for the deviation rate of resistance of actual heads to a designed resistance value as shown in FIG. 2. The designed resistance value is a designed value for the resistance of the head calculated based on the configuration of the MR element portion or the like and the specific resistivity of the material while neglecting the contact resistance between each of the layers. From the result, it has been confirmed that the resistance deviation rate for satisfying the device guarantee (for five years) is within 20% relative to the previously calculated designed resistance value.

From the result, it can be confirmed that if the entire resistance value for the MR element portion 5 including the contact resistance between the MR element portion 5 and the longitudinal bias layer 6 and the like described previously is within a range of 1.2 times (the deviation rate within 20%) of the theoretical value, the device life time for five years can be attained at a constant current, for example, of $4 \times 10^7$ (A/cm$^2$).

Figure 3:
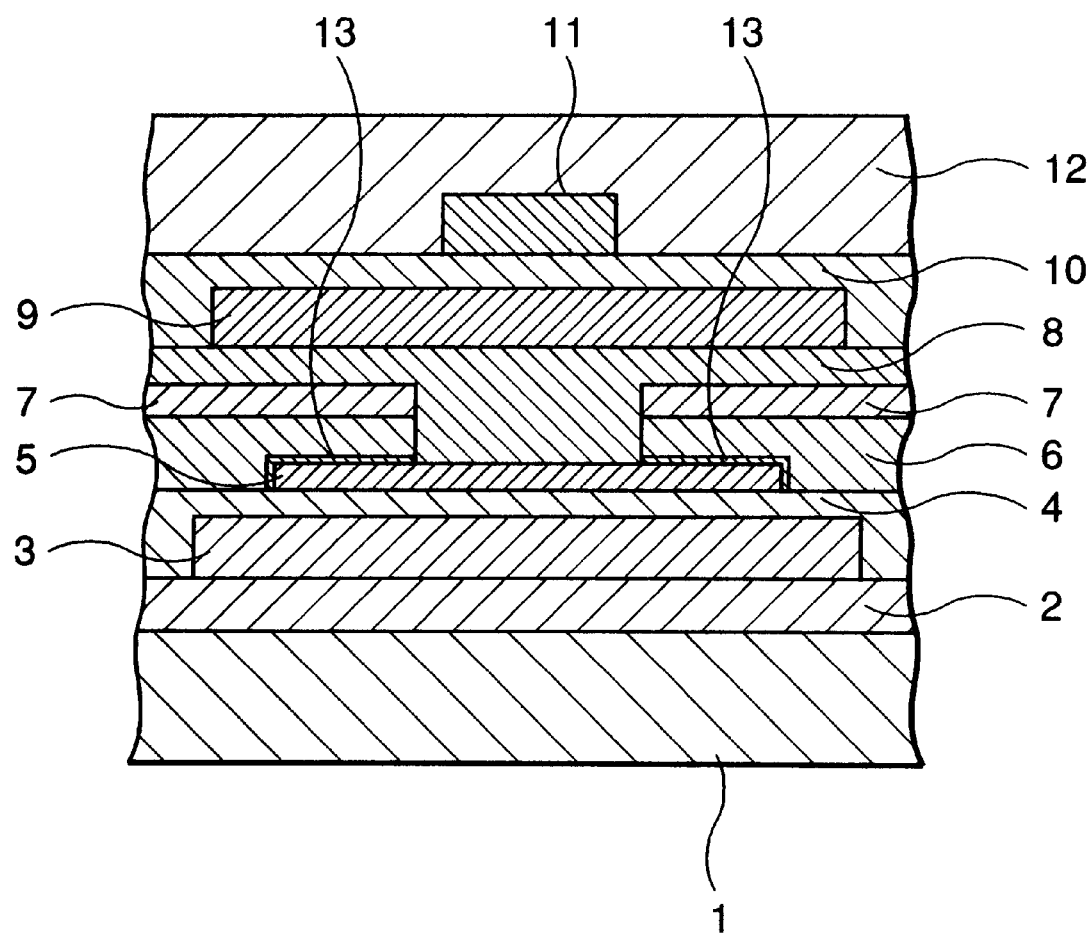
FIG. 3 is a cross sectional view showing a constitution of a second embodiment according to the present invention.

FIG. 3 shows a second embodiment of the present invention.

The second embodiment shown in FIG. 3 has a feature in that a polysilicon layer 13 having a high surface energy (good wettability) is deposited to a thickness of several nanometers (for example, to a thickness of not more than 10 nm) at a junction portion between the MR element portion 5 and the longitudinal bias layer (exchange biasing layer) 6, in which a portion between the MR element portion 5 and the longitudinal bias layer (exchange biasing layer) 6 is made eutectic, for suppressing the increase of the resistance value in the first embodiment described above shown in FIG. 1. With a view point of ensuring magnetic characteristics in the high density recording, there is a limit for a distance between the magnetic layers, that is, the distance between the upper shield 9 and the lower shield, so that the layer thickness of the polysilicon layer 13 is desirably not more than 10 nm. Further, the layer thickness is desirably not less than 1 nm considering the size of atoms. Other constitutions are identical with those of the first embodiment shown in FIG. 1 described previously.

With such an embodiment, identical functions and effects as those in the first embodiment shown in FIG. 1 described previously can also be provided. In addition, since the polysilicon layer has a large chemical bond force, this can prevent increase of the resistance value due to the variation of the contact resistance at that portion, thereby enabling to obtain a magnetoresistive read transducer of high reliability.

In the second embodiment, descriptions have been made to a case of providing the polysilicon layer 13 between the MR element portion 5 and the longitudinal bias layer 6, but a polysilicon layer may be disposed between the longitudinal bias layer 6 and the electrode layer 7 described previously. Alternatively, the polysilicon layer 13 may also be provided between the MR element portion 5 and the longitudinal bias layer 6, as well as between the longitudinal bias layer 6 and the electrode layer 7 respectively.

With such a construction, identical function and effect with those of the first embodiment described previously can be obtained.

Figure 4:
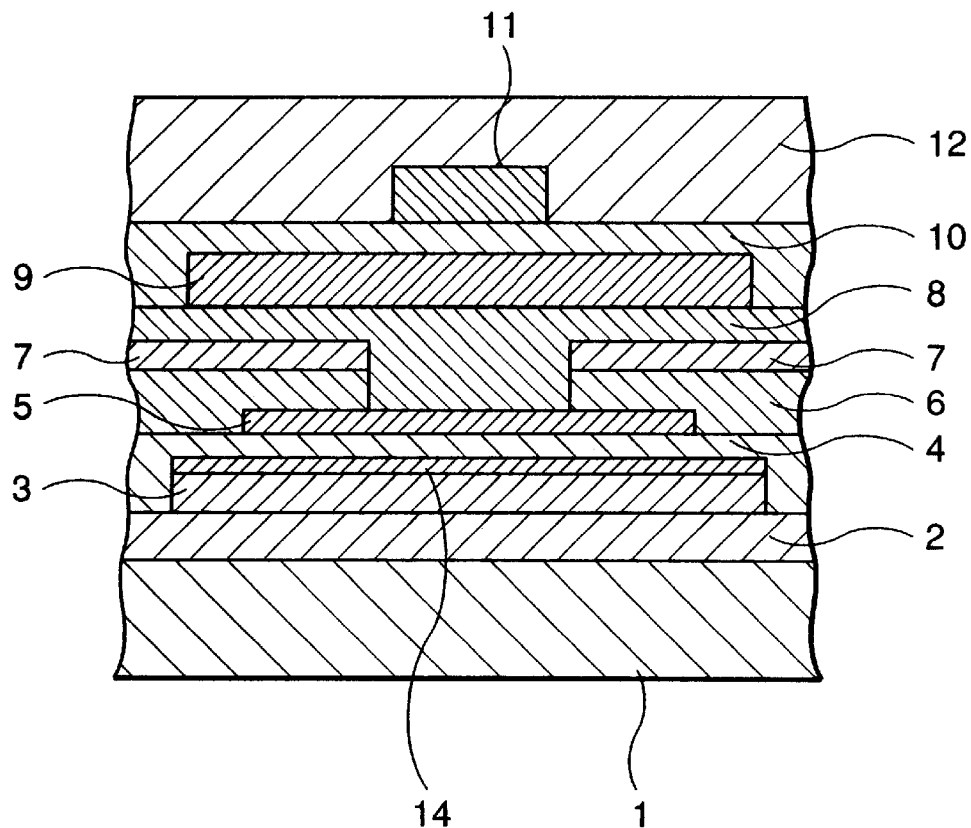
FIG. 4 is a cross sectional view showing a constitution of a third embodiment according to the present invention.
Figure 5:
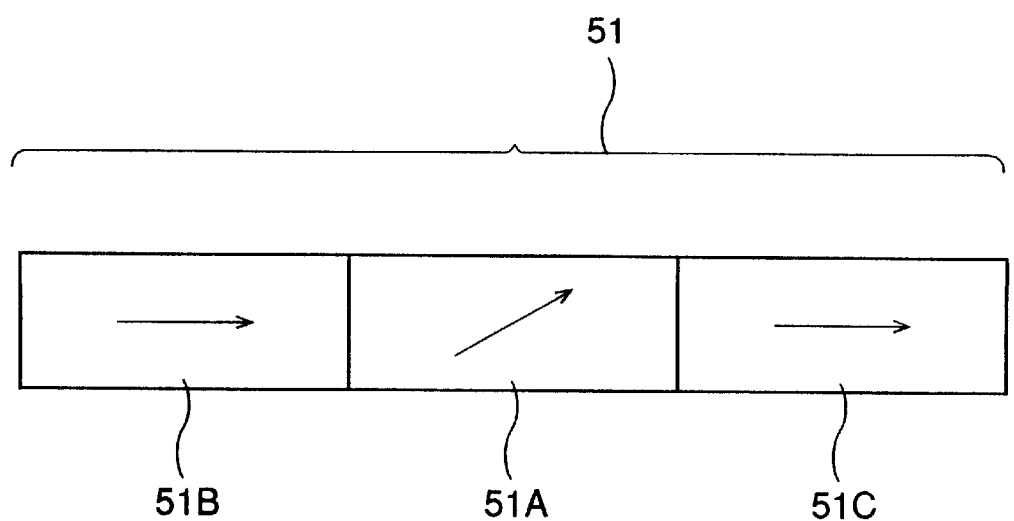
FIG. 5 is an explanatory view illustrating a general outlined constitution of a magnetoresistive read transducer.

FIG. 4 shows a third embodiment of the present invention.

The third embodiment shown in FIG. 4 has a feature in that a layer having good heat conductivity 14 comprised of a sputtered NiFe layer is disposed to a layer thickness of several tens nanometer between the lower shield 3 and the first gap layer 5 in the first embodiment shown in FIG. 1 described previously. Other constructions are identical with those of the first embodiment shown in FIG. 1 described previously.

With such a construction, particularly, since heat generation caused by the sense current supplied to the MR element portion is transmitted by way of the highly heat conductive layer 14 to other members easily and dissipated in this embodiment, the temperature rise thereof is suppressed effectively and the thermal degradation of each of the upper and the lower shields 9, 3 is suppressed and, in this regard, a magnetoresistive read transducer of high reliability can be obtained.

Further, since the temperature rise is suppressed, the temperature rise in the region belonging to the path of current flowing through the MR element is suppressed and, as a result, increase of the resistance value due to the resistance value at that portion and the contact resistance can be prevented, so that identical function and effect with those in the first embodiment can also be obtained.

In this case, the highly heat conductive layer 14 may be a sputtered Cu layer or a polysilicon (poly Si) layer instead of the sputtered NiFe layer described previously.

With such a construction, a layer having good heat conductivity 14 having a function like that of the sputtered NiFe layer described previously can be obtained.

As has been described above according to the present invention relating to the magnetoresistive read transducer for detection of signal magnetic fluxes, since the output can be increased by the increase of the current and the temperature rise is suppressed, it is possible to reduce the noises, remarkably increase the electric conduction life and, in this regard, a magnetoresistive read transducer of a high durability and reliability can be obtained.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore, contemplated that the appended claims will cover any such modifications or embodiments as fall within the true scope of the invention.

What is claimed is:

1. A magnetoresistive read transducer comprising:

a substrate, an insulating layer formed on the substrate, a lower shield formed on the insulating layer, a first gap layer formed on the lower shield, a thin film magnetoresistive element formed in a predetermined pattern on the first gap layer, a longitudinal bias layer formed on portions of the magnetoresistive effect element other than a central active portion and on the first gap layer, first and second electrodes formed on the longitudinal bias layer for applying a conduction current from the outside, a second gap layer formed on the electrodes and magnetoresistive effect element portion, and an upper shield formed on the second gap layer wherein the total resistance value upon electric conduction including the contact resistance between each of the layers is within 1.2 times of a theoretical value calculated based on the shape of the magnetoresistive element portion and the specific resistivity of the material.

2. A magnetoresistive read transducer as defined in claim 1, further comprising: a polysilicon layer laminated between the magnetoresistive element portion and the longitudinal bias layer, in which the magnetoresistive element portion and the longitudinal bias layer are made eutectic respectively at a junction portion with the polysilicon layer.

3. A magnetoresistive read transducer as defined in claim 1, wherein the polysilicon layer has a layer thickness of not less than 1 nm and not more than 10 nm.

4. A magnetoresistive read transducer as defined in claim 1, further comprising:

a polysilicon layer laminated between the longitudinal bias layer and the electrodes, in which the longitudinal bias layer and the electrodes are made eutectic respectively at the junction portion with the polysilicon layer.

5. A magnetoresistive read transducer as defined in claim 4, wherein the polysilicon has a layer thickness of not less than 1 nm and not more than 10 nm.

6. A magnetoresistive read transducer as defined in claim 1, further comprising a layer having good heat conductivity disposed on the lower shield.

7. A magnetoresistive read transducer as defined in claim 6, wherein the layer having good heat conductivity is formed of a sputtered NiFe layer.

8. A magnetoresistive read transducer as defined in claim 6, wherein the layer having good heat conductivity is formed of a sputtered Cu layer.

9. A magnetoresistive read transducer as defined in claim 6, wherein the layer having good heat conductivity is formed of a polysilicon film.

10. A magnetoresistive read transducer comprising:

a substrate, an insulating layer formed on the substrate, a lower shield formed on the insulating layer, a first gap layer formed on the lower shield, a thin film magnetoresistive element formed in a predetermined pattern on the first gap layer, a longitudinal bias layer formed on portions the magnetoresistive effect element other than a central active portion and on the first gap layer, first and second electrodes formed on the longitudinal bias layer for applying a conduction current from the outside, a second gas layer formed on the electrodes and magnetoresistive effect element portion, and an upper shield formed on the second gap layer and, further, a polysilicon layer laminated between the magnetoresistive element portion and the longitudinal bias portion, wherein the magnetoresistive element portion and the longitudinal bias layer are made eutectic respectively at a junction portion with the polysilicon layer.

11. A magnetoresistive read transducer as defined in claim 10, wherein the polysilicon layer has a layer thickness of not less than 1 nm and not more than 10 nm.

12. A magnetoresistive read transducer comprising:

a substrate, an insulating layer formed on the substrate, a lower shield formed on the insulating layer, a first gap layer formed on the lower shield, a thin film magnetoresistive element formed in a predetermined pattern on the first gap layer, a longitudinal bias layer formed on portions of the magnetoresistive effect element other than a central active portion and on the first gap layer, first and second electrodes formed on the longitudinal bias layer for applying a conduction current from the outside, a second gap layer formed on the electrodes and magnetoresistive effect element portion, and an upper shield formed on the second gap layer, wherein the magnetoresistive element portion and the longitudinal bias layer are made eutectic respectively at a junction portion with the polysilicon layer.

13. A magnetoresistive read transducer as defined in claim 12, wherein the polysilicon layer has a layer thickness of not less than 1 nm and not more than 10 nm.

14. A magnetoresistive read transducer comprising:

a substrate, an insulating layer formed on the substrate, a lower shield formed on the insulating layer, a first gap layer formed on the lower shield, a thin film magnetoresistive element formed in a predetermined pattern on the first gap layer, a longitudinal bias layer formed on portions of the magnetoresistive effect element other than a central active portion and on the first gap layer, first and second electrodes formed on the longitudinal bias layer for applying a conduction current from the outside, a second gap layer formed on the electrodes and magnetoresistive effect element portion, and an upper shield formed on the second gap layer and, further, a layer having good heat conductivity disposed above the lower shield layer.

15. A magnetoresistive read transducer as defined in claim 14, wherein the layer having good heat conductivity is formed of a sputtered NiFe layer.

16. A magnetoresistive read transducer as defined in claim 14, wherein the layer having good heat conductivity is formed of a sputtered Cu layer.

17. A magnetoresistive read transducer as defined in claim 14, wherein the layer having good heat conductivity is formed of a polysilicon film.

* * * * *